United States Patent
Leito

(10) Patent No.: US 9,434,901 B2
(45) Date of Patent: Sep. 6, 2016

(54) DEVICE AND METHOD FOR SEPARATING A FLOWING MEDIUM MIXTURE INTO FRACTIONS

(75) Inventor: Raichel Elton Taciano Leito, Curacao (NL)

(73) Assignee: ROMICO HOLD A.V.V., Oranjestad (AW)

( * ) Notice: Subject to any disclaimer, the term of this patent is extended or adjusted under 35 U.S.C. 154(b) by 1408 days.

(21) Appl. No.: 11/569,921

(22) PCT Filed: May 31, 2005

(86) PCT No.: PCT/NL2005/000396
§ 371 (c)(1),
(2), (4) Date: May 22, 2008

(87) PCT Pub. No.: WO2005/118110
PCT Pub. Date: Dec. 15, 2005

(65) Prior Publication Data
US 2008/0257788 A1    Oct. 23, 2008

(30) Foreign Application Priority Data

Jun. 1, 2004  (NL) ..................................... 1026299

(51) Int. Cl.
| | | |
|---|---|---|
| B01D 45/14 | (2006.01) |
| C10L 3/10 | (2006.01) |
| B01D 17/02 | (2006.01) |
| B01D 17/04 | (2006.01) |
| B01D 19/00 | (2006.01) |
| B01D 53/24 | (2006.01) |
| B04C 3/00 | (2006.01) |

(52) U.S. Cl.
CPC ........... *C10L 3/102* (2013.01); *B01D 17/0217* (2013.01); *B01D 17/042* (2013.01); *B01D 19/0094* (2013.01); *B01D 45/14* (2013.01); *B01D 53/24* (2013.01); *B04C 3/00* (2013.01); *C10L 3/10* (2013.01)

(58) Field of Classification Search
None
See application file for complete search history.

(56) References Cited

U.S. PATENT DOCUMENTS

| 2,900,797 | A |  | 8/1959 | Kurata et al. ..................... 62/12 |
| 3,132,016 | A |  | 5/1964 | Kurata et al. ..................... 62/15 |
| 4,087,261 | A |  | 5/1978 | Hays ................................ 55/41 |
| 4,994,097 | A | * | 2/1991 | Brouwers ...................... 55/317 |
| 2002/0194994 | A1 |  | 12/2002 | Brown ............................ 95/270 |

FOREIGN PATENT DOCUMENTS

| CH | 553 591 | 9/1974 |
| DE | 28 50 019 | 5/1980 |
| EP | 0 286 160 | 10/1988 |

(Continued)

OTHER PUBLICATIONS

Database WPI, Section Ch, Week 198523, Derwent Publications Ltd., London, GB; AN 1985-139837 XP002339179.

*Primary Examiner* — Dirk Bass
(74) *Attorney, Agent, or Firm* — The Webb Law Firm

(57) ABSTRACT

The invention relates to a device for separating a flowing medium mixture into at least two fractions, comprising rotating means, means for physically increasing the difference in mass density of the fractions for separating, a feed for medium and a first outlet for discharging one of the fractions of the separated medium mixture. The invention also relates to a method for separating a flowing medium mixture.

5 Claims, 3 Drawing Sheets

(56) References Cited

FOREIGN PATENT DOCUMENTS

| GB | 1 103 130 | 2/1968 |
| SU | 1 125 021 | 11/1984 |
| WO | WO 00/40835 | 7/2000 |
| WO | WO 03/092850 | 11/2003 |

* cited by examiner

DEVICE AND METHOD FOR SEPARATING A FLOWING MEDIUM MIXTURE INTO FRACTIONS

The invention relates to a device for separating a flowing medium mixture into at least two fractions with differing mass density, comprising rotating means for rotating the flowing mixture for separating. The invention also relates to a method for separating a flowing medium mixture into at least two fractions with differing mass density.

The separation of a flowing medium mixture has very diverse applications. Medium mixture is here understood to mean a mixture of at least one liquid or a gas which can be mixed with solid material parts such as a powder or an aerosol. Examples are a gas/gas mixture, a gas/liquid mixture, a liquid/liquid mixture, a gas/solid mixture, a liquid/solid mixture, or such a mixture provided with one or more additional fractions. The separation of a flowing medium mixture is for instance known from various applications of liquid cleaning, (flue) gas cleaning and powder separation. Separation of fractions with a great difference in particle size and/or a great difference in mass density is relatively simple. Large-scale use is made for this purpose of processes such as filtration and screening. In the separation of fractions with a smaller difference in mass density use is made of chemical separating techniques and/or separating techniques such as sedimentation and centrifugation. Certainly when processing large volumes of medium mixture, chemical separating techniques are less economic and usually also less environmentally-friendly. Separating fractions by means of sedimentation requires time and, when processing larger volumes of medium mixture, makes it necessary to make use of voluminous reservoirs, which is, among other things, expensive. Another technology makes use of the differences in mass density of the fractions for separating by applying a centripetal force to the mixture by causing the mixture to rotate in a centrifuge or a cyclone. This technique is not usually sufficiently selective to realize a separation of the desired level in a short time.

The present invention has for its object to increase, with limited investment, the speed and the quality of the separation of fractions of a flowing medium mixture.

The invention provides for this purpose a device of the type stated in the preamble, also comprising a means connecting in flow direction of the medium to the rotating means for physically increasing the difference in mass density of the fractions for separating, a feed for the medium mixture for separating which connects to the means influencing mass density, and a first outlet connecting to the rotating means for discharging one of the fractions of the separated medium mixture. The device is preferably also provided with a second outlet likewise connecting to the rotating means for discharging a second component of the separated medium mixture. According to the present invention the separation efficiency of the rotating means is increased by influencing the mass density of at least a part of the mixture before the medium reaches the rotating means such that the differences in mass density of the fractions for separating are increased. Increasing the difference in mass density of the fractions for separating can for instance take place by changing the temperature (heating or cooling, depending on the circumstances) of the mixture. It is thus simpler to separate the fractions from each other by means of rotation (as a result of the increase of the difference in centripetal forces exerted on the fraction). It is herein noted that separating of the fractions is understood to mean at least partly separating two fractions such that a significant difference in the average mass density of the two fractions results; a complete (100%) separation will be difficult to realize in practice. As a result of the rotation of the mixture now having greater differences in the mass density of the fractions for separating, the lighter fraction will migrate at least substantially to the inner side of the rotation and the heavier fraction will migrate at least substantially to the outer side of the rotation. This is a separation which increases the options for use of at least one of the fractions relative to the mixture. This usable ("cleaned") fraction may still have a part of another undesired fraction even after separation ("be contaminated with another fraction"), but this other fraction is significantly smaller than the presence of this undesired fraction in the original mixture. The subsequent processing of the medium results in an unexpectedly high separation efficiency without voluminous equipment being required for this purpose (i.e. the device can take a very compact form) and in which the medium only has to be treated for a short period. A device can be given an even smaller form (with a smaller volume) if the medium mixture comprises at least one gas fraction and the medium mixture is carried through the device under higher pressure.

In a preferred variant, the rotating means are formed by a rotating assembly of feed channels. Such rotating separators have the advantage that the average distance of the medium from a wall (in radial direction) remains limited, whereby a desired degree of separation can be achieved in a relatively short time (which corresponds to a relatively limited length of the rotating separator in axial direction). The operation of such a rotating assembly of feed channels is further positively influenced if a laminar flow of the medium is maintained in the channels. Conversely, it is also possible for the medium to be carried through the channels with turbulent flow. The flow speeds to be applied can be varied or optimized according to the situation.

The rotating means can however also be formed by at least one cyclone (vortex), or alternatively by an assembly of a plurality of cyclones. In the case of a cyclone it is possible to give the rotating means a stationary form and to set only the medium into rotation. The application of a plurality of (smaller) cyclones has an advantage relative to a single cyclone which is comparable to the advantage of a rotating assembly of feed channels. Baffles can optionally be placed in a cyclone, for instance for the purpose of causing a determined fraction to condense on the baffles and for controlling the cyclone.

In a preferred embodiment the means influencing mass density comprise expansion means. By means of (optionally isotropic) expansion the temperature of a medium can be decreased within a very short time. This can for instance be realized by applying an expansion cooler of the "joule thomson" type or a turbine. Another option is that the cooling is brought about by a cooling medium, which is for instance expanded in a separate circulation system so as to be thus brought to the desired low temperature level. The advantage of working with a separate cooling medium, compared to expansion of the medium for separating, is for instance that this separate cooling medium can be optimized for the desired cooling action. The advantage of a temperature decrease is that the density of the fractions is affected hereby. Particularly favourable effects can thus be achieved if the mixture consists of fractions with the same phase (for instance gas/gas mixture or a liquid/liquid mixture), at least one fraction of which undergoes a phase change due to the temperature change such that the phases of the fractions for separating differ from each other (whereby for instance a gas/liquid mixture, a gas/solid mixture or a liquid/solid mixture results). This phenomenon of phase change of a substance as a result of temperature change is of course a generally known phenomenon. The present invention is however based on the very advantageous combination of the phase change (or in any case change in the difference in mass density of fractions for separating) combined with the subsequent separation of two fractions by means of rotation. A mixture of a gas with for instance an aerosol or a powder (solid) can then be readily separated using the rotating means. It is however expressly noted that for the separation by means of the rotating means it is not necessary to create a phase difference between the components for separating; the device is equally applicable to a mixture of fractions which are in the same phase (for instance liquid/liquid mixtures such as a dispersed liquid and gas/gas mixtures). For the best possible operation it is desirable here to have the mass density of the fractions for separating differ as much as possible.

In yet another preferred variant, the means influencing mass density can comprise active or passive cooling means. These cooling means can be deployed directly to increase the mass density of the fractions for separating. In a particularly advantageous application, the cooling means are disposed upstream of the expansion means in the direction of flow of the medium. The mixture is thus first cooled down before the expansion begins and then reaches a much lower temperature level as a result of the expansion, thereby creating extra options for separating the fractions. This can be a very advantageous solution energetically, for instance if the (pre-)cooling can take place by dissipation into the environment. This will be further elucidated hereinbelow on the basis of further developed examples. Some examples of possible applications of the present invention are the separation of an air/nitrogen mixture, de-aerating or degassing of water, dehydrating of air, cleaning of natural gas.

The invention also relates to a method for separating a flowing medium mixture into at least two fractions with differing mass density, comprising the processing steps of: A) supplying a mixture for separating, B) physically increasing the difference in mass density of the fractions for separating in the mixture for separating, C) causing rotation of the flowing mixture for separating, and D) discharging at least one of the separated fractions. By means of this method the advantages can be realized as already described above on the basis of the device according to the invention. The method can be performed with a relatively small through-flow device since the separate processing steps can be carried out within a very short period of time (processing steps B and C), individually in less than 1 second, usually in less than 0.1 second or even in less than 10 or less than 5 milliseconds. This makes lengthy processes, with associated devices which are dimensioned such that they can contain large volumes, unnecessary. The inventive combination of processing steps B) and C) provides the unexpected advantage of a much simpler fraction separation than was possible according to the prior art. A simple method for increasing the difference in mass density of the fractions of the mixture for separating is based on causing the mixture to expand. The fall in temperature resulting herefrom provides the desired effect of increasing the difference in mass density of the fractions for separating within a very short time; this effect can be obtained in less than 0.1 or less than 0.05 second while making use of extremely simple means. The effect of increasing the difference in mass density of the fractions for separating can be influenced even further in positive manner by cooling the mixture before separating the mixture during processing step C), and it is even more preferable if the mixture is cooled before it is expanded. The expansion can then result in even lower temperatures of the mixture.

In a particular preferred application of the method, natural gas is supplied during processing step A), and during processing step B) the temperature of the natural gas is lowered as a result of expansion to a temperature lower than $-50°$ C., or less than $-60°$ C., whereby the fractions of contaminated substances present in the natural gas, such as for instance $CO_2$ and $H_2S$, at least substantially change phase, which contaminated fractions (for instance $CO_2$ and $H_2S$) are separated from the fraction of hydrocarbons during processing step C) such that the fraction of hydrocarbons with the contaminants at least partly removed is discharged during processing step D). The reserves of natural gas which can be recovered in economically cost-effective manner are limited since a significant part of the technically recoverable natural gas is contaminated with unwanted gasses. Certainly when they occur in the natural gas in tens of percents, it has heretofore not been possible to separate these contaminated gases to a sufficient extent from the hydrocarbons in economically cost-effective manner.

The present invention will be further elucidated on the basis of the non-limitative exemplary embodiments shown in the following figures. Herein:

Figure 1:
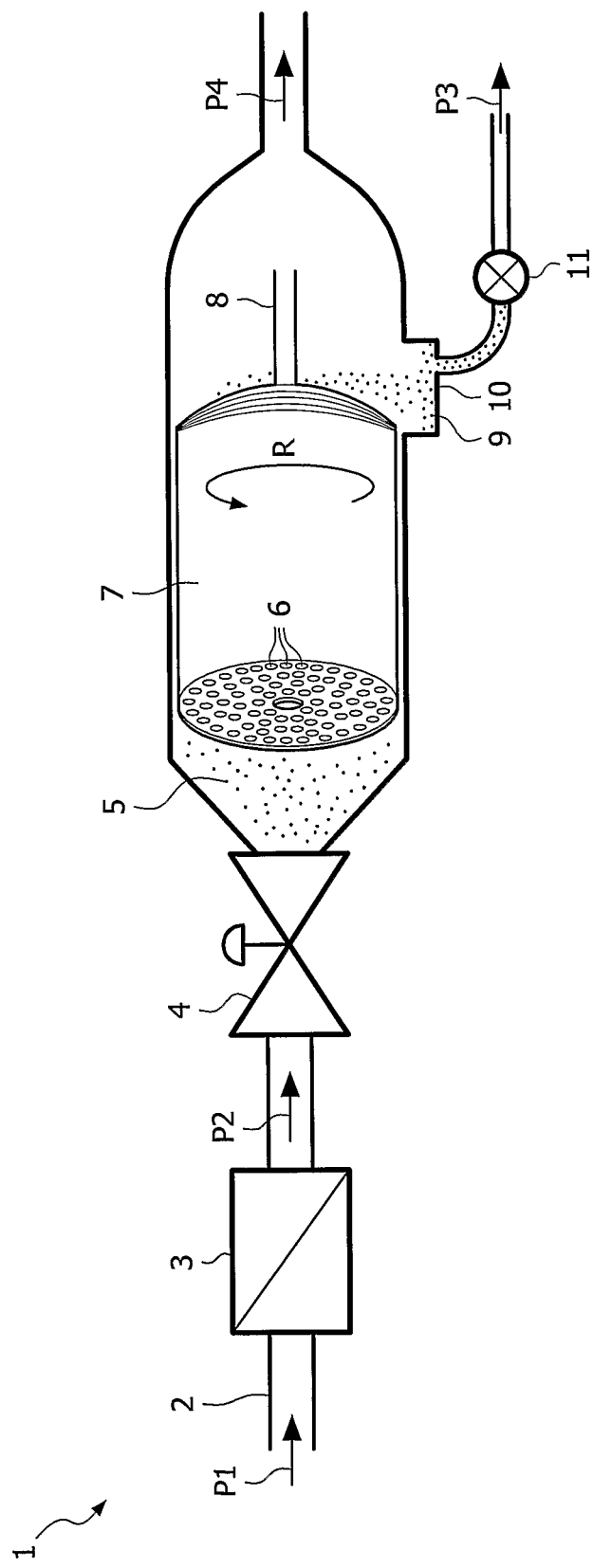
FIG. 1 shows a schematic view of a device according to the invention.

FIG. 1 shows a device 1 for cleaning a contaminated gas such as for instance natural gas. The contaminated gas is supplied as according to arrow $P_1$ by a feed 2 under a pressure of between 100 and 300 Bar (usually a typical pressure of about 250 Bar) and at a temperature of more than or about $100°$ C. The gas supplied as according to arrow 1 is then cooled in a heat exchanger 3, for instance by means of cooling into the atmosphere. The cooled gas flows from heat exchanger 3 as according to arrow $P_2$ to a throttle valve 4. The gas supplied as according to arrow $P_2$ is expanded by means of throttle valve 4, preferably in isotropic manner, to a lower pressure of between 5 and 20 Bar. As a result of the sudden fall in pressure the temperature of the gas will fall (for instance to a temperature lower than $-50°$ C.) such that a part of the fractions present in the gas changes phase. A gas/vapour mixture 5 (aerosol) is created as a result. This gas/vapour mixture 5 is carried through channels 6 of a rotor 7 as a result of the rotation R, whereby the vapour condenses against the sides of channels 6 of rotor 7 which are remote from a rotation shaft 8. The condensed vapour leaves rotor 7 as liquid droplets 9 on the side remote from throttle valve 4. Droplets 9, which consist for instance of liquid $CO_2$ and $H_2S$, are collected in a basin 10 which can be emptied by means of activating a pump 11 such that the liquid $CO_2$ and $H_2S$ are discharged as according to arrow $P_3$. The gas leaving rotor 7 thus has $CO_2$ and $H_2S$ at least partly removed and leaves device 1 as according to arrow $P_4$ as cleaned gas.

Figure 2:
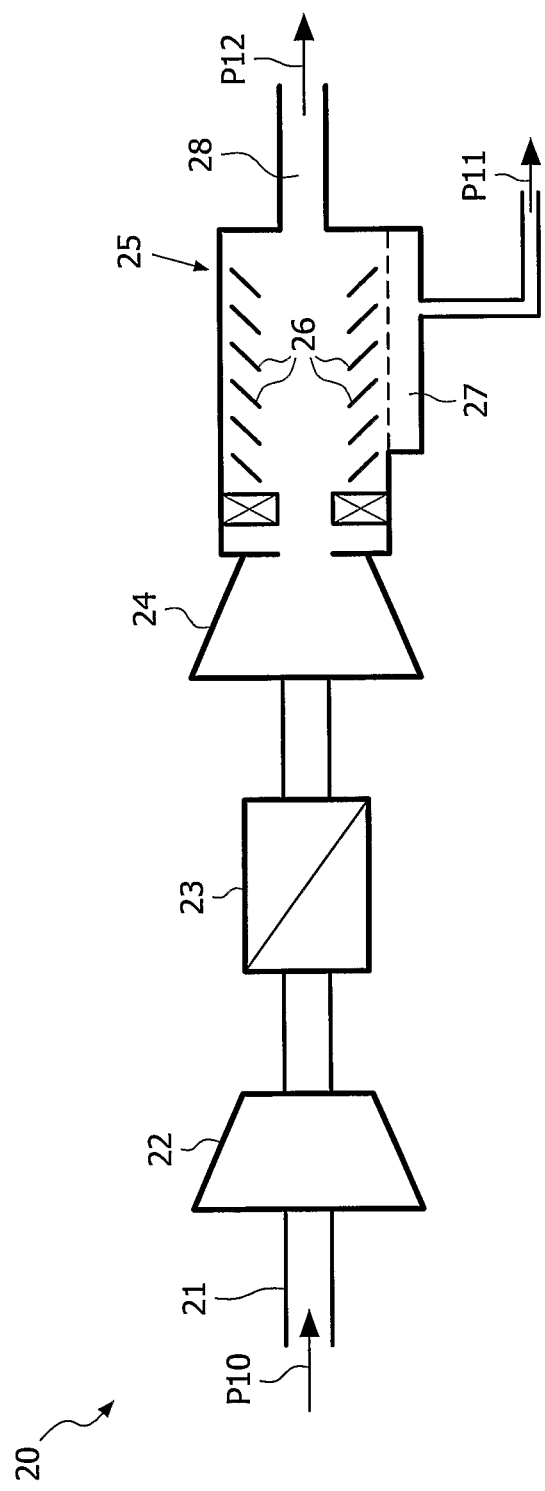
FIG. 2 shows a schematic view of an alternative embodiment variant of a separating device according to the invention.

FIG. 2 shows a separating device 20 to which a gas mixture for separating is supplied by a feed 21 as according to arrow $P_{10}$. In a connecting turbine 22 the mixture is compressed in order to then enable more efficient cooling of the gas mixture in a connecting heat exchanger 23. The pressure increased by compressor 22 also makes it possible to have the whole device 20 operate at a higher pressure level (for instance 10 to 50 Bar), whereby it can be given a more compact form than if this compression step were to be omitted. After cooling of the mixture in heat exchanger 23, the mixture is fed to a turbine 24. Owing to the pressure-decreasing effect resulting from turbine 24 the temperature of the mixture will decrease such that a fraction of the mixture changes to the liquid phase. In the cyclone 25 connected to turbine 24 the liquid fraction will condense on the baffles 26 present in cyclone 25. The droplets falling from baffles 26 are collected in a drip tray 27, from which the liquid fraction is further discharged as according to arrow $P_{11}$. The gas fraction leaves the cyclone through a central outlet 28 as according to arrow $P_{12}$. A typical flow speed of the mixture is 5 to 15 meters/second, more in particular 10 m/s.

Figure 3:
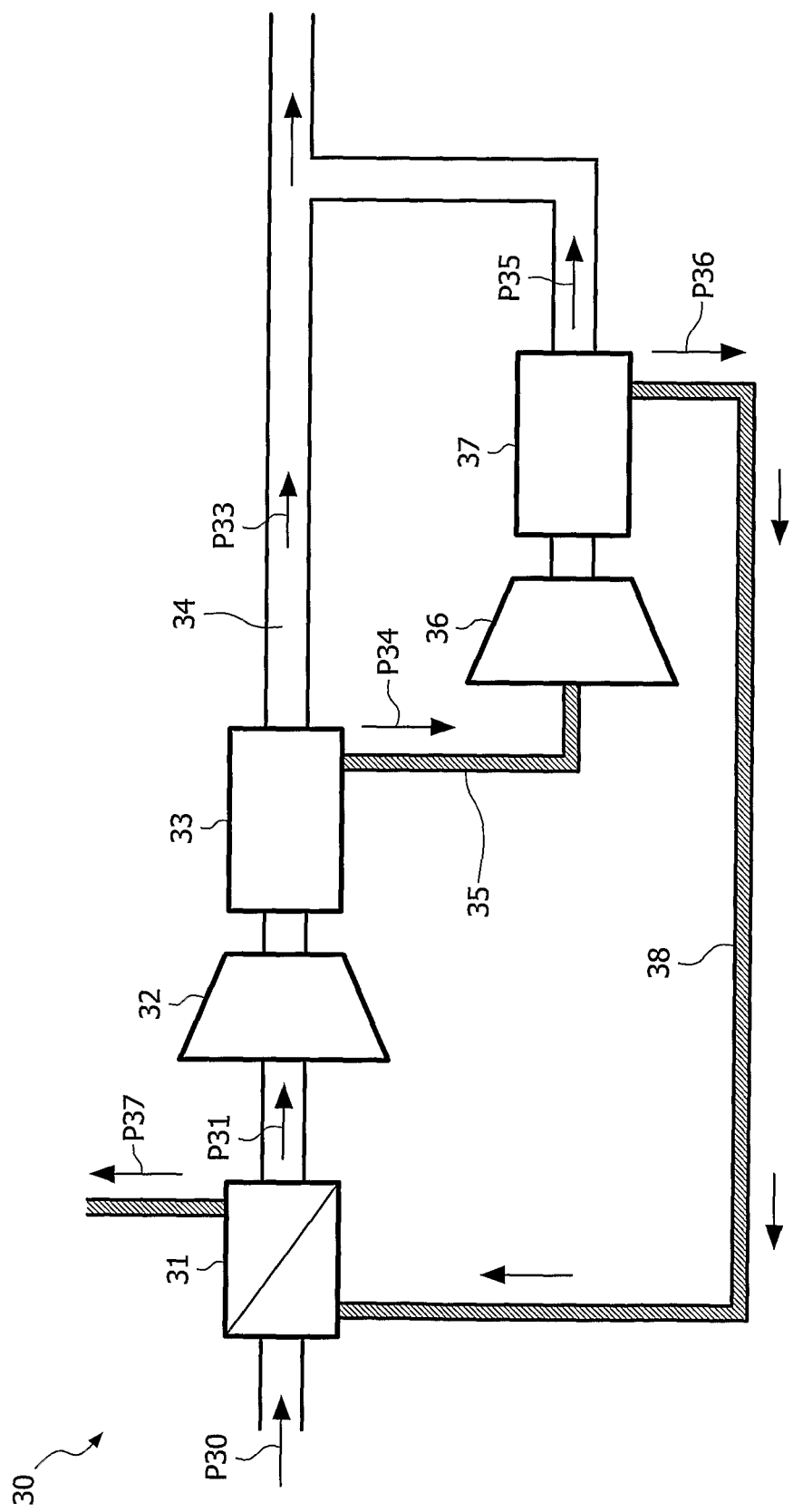
FIG. 3 shows a schematic view of a second alternative embodiment variant of a multiple separating device according to the invention.

FIG. 3 shows a view of a multiple separating device 30 to which a mixture for separating is supplied as according to arrow $P_{30}$. After cooling of the mixture in a cooler 31, the now cooled mixture flows to a turbine 32 as according to arrow $P_{31}$. After passing through turbine 32 the mixture, with now a greater difference in the mass density of the fractions for separating, flows to a schematically shown rotating separator 33. A first, for instance gaseous, fraction leaves rotating separator 33 through an outlet 34 as according to arrow $P_{33}$. A second fraction (for instance a cold liquid fraction) leaves rotating separator 33 through a second outlet 35 as according to arrow $P_{34}$. The second fraction is then fed to another turbine 36 and a rotating separator 37 connecting thereto, where a renewed separating process takes place for the purpose of separating as according to arrow $P_{35}$ a gas fraction (which may or may not be the same gaseous fraction as already separated in rotating separator 33) remaining in the second liquid fraction, which gas fraction then flows together with the gaseous fraction already separated in the first rotating separator 33. The liquid fraction separated in rotating separator 37 is carried back to heat exchanger 31 through a return conduit 38 as according to arrow $P_{36}$ in order to increase the efficiency of heat exchanger 31. In heat exchanger 31 the liquid fraction coming from the second rotating separator 37 functions as coolant before it exits device 30 via an outlet as according to arrow $P_{37}$. It is noted that instead of the second fraction ($P_{34}$), or just as the second fraction ($P_{34}$), the first fraction ($P_{33}$) leaving the rotating separator 33 can also be subjected to a renewed separating process by means of for instance a turbine, not shown in this figure, and a rotating separator connecting thereto which connect to outlet 34. Renewed separating of already separated fractions can optionally also be carried out more than twice in succession.

The invention claimed is:

1. A method for separating a contaminated gas flow into at least two fractions having different mass densities and removing $CO_2$ and/or $H_2S$ contaminants from the gas flow, comprising:

Supplying a contaminated gas flow mixture for separating;

Expanding the gas flow mixture to physically increase the difference in mass densities of the fractions to be separated while maintaining a pressure of 10 bars or higher such that at least a portion of the $CO_2$ and/or $H_2S$ contaminants in the expanded gas stream become liquefied and the remainder of the gas flow mixture remains in the gas phase;

Rotating the gas flow mixture in a rotating assembly of feed channels, thereby removing condensed $CO_2$ and/or $H_2S$ from the gas flow, wherein the mixture is cooled before the mixture is separated by rotating the gas flow mixture; and Discharging at least one of the separated fractions.

2. The method according to claim 1, wherein the contaminated gas flow is a natural gas stream.

3. The method according to claim 1, wherein the cooling of the gas flow mixture is controlled independently of the rotating of the gas flow mixture.

4. The method according to claim 1, wherein the contaminated gas flow is a natural gas stream containing $CO_2$ and/or $H_2S$ contaminants;

the expansion of the natural gas stream lowers the temperature of the natural gas stream to a temperature lower than 50° C., thereby causing at least a portion of the $CO_2$ and/or $H_2S$ contaminants present in the natural gas stream to change phase while the remainder of the natural gas stream remains in the gas phase; and said contaminants are subsequently separated from the natural gas and the natural gas stream fraction is discharged from the rotating means.

5. A method for separating a contaminated gas flow into at least two fractions having different mass densities and removing $CO_2$ and/or $H_2S$ contaminants from the gas flow, comprising:

Supplying a contaminated gas flow mixture for separating;

Expanding the gas flow mixture to physically increase the difference in mass densities of the fractions to be separated while maintaining a pressure of 10 bars or higher such that at least a portion of the $CO_2$ and/or $H_2S$ contaminants in the expanded gas stream become liquefied and the remainder of the gas flow mixture remains in the gas phase;

Rotating the gas flow mixture in a rotating assembly of feed channels, thereby removing condensed $CO_2$ and/or $H_2S$ from the gas flow, wherein the expansion of the gas flow mixture is controlled independently of the rotating of the gas flow mixture; and Discharging at least one of the separated fractions.

* * * * *

UNITED STATES PATENT AND TRADEMARK OFFICE
CERTIFICATE OF CORRECTION

| | |
|---|---|
| PATENT NO. | : 9,434,901 B2 |
| APPLICATION NO. | : 11/569921 |
| DATED | : September 6, 2016 |
| INVENTOR(S) | : Raichel Elton Taciano Leito |

Page 1 of 1

It is certified that error appears in the above-identified patent and that said Letters Patent is hereby corrected as shown below:

On the title page, item 56, Column 2, OTHER PUBLICATIONS, Line 2, Before "AN" insert -- Class D14, --

In the claims

Column 6, Line 27, Claim 4, delete "50° C.," and insert -- -50° C., --

Signed and Sealed this
Twenty-ninth Day of November, 2016

Michelle K. Lee
*Director of the United States Patent and Trademark Office*